Patented Apr. 25, 1939

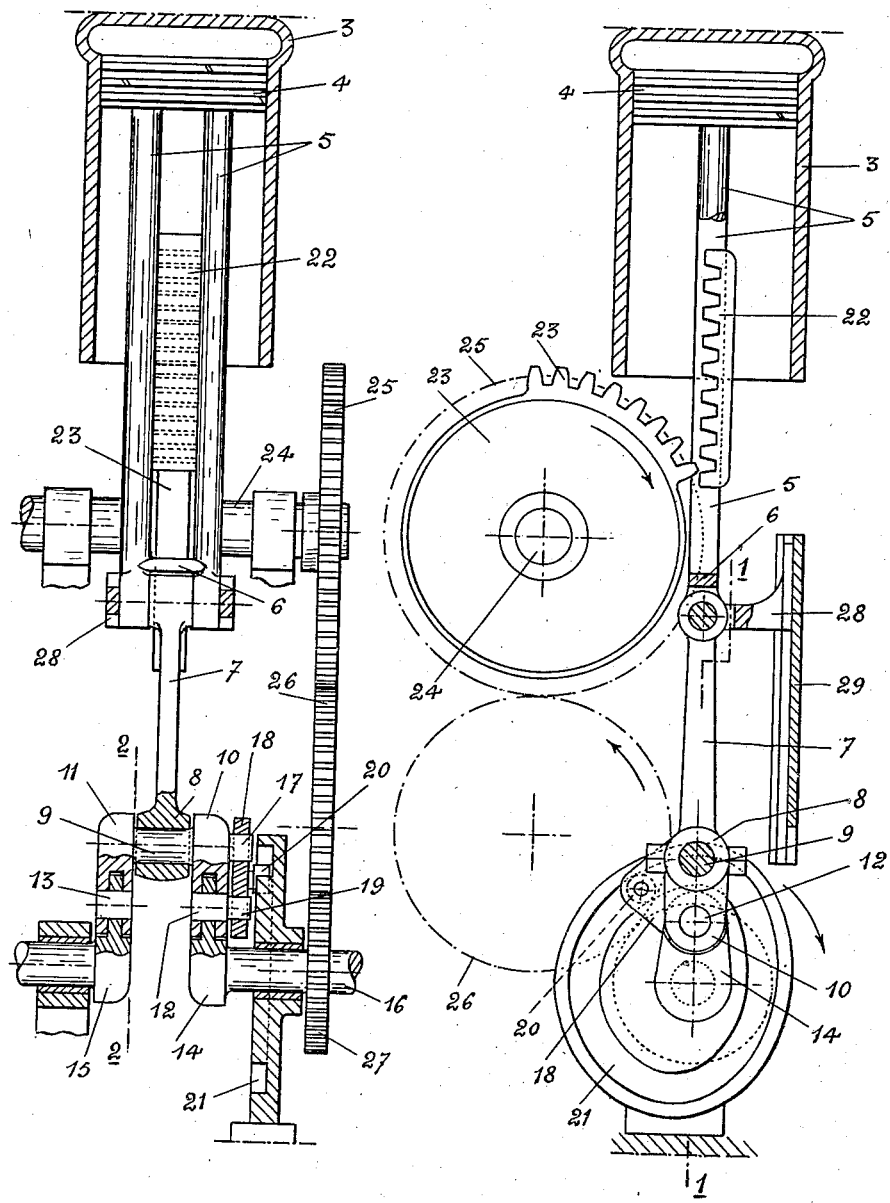

2,155,497

UNITED STATES PATENT OFFICE 2,155,497

TRANSFORMING ALTERNATING RECTILINEAR MOVEMENT INTO CONTINUOUS ROTARY MOVEMENT

Adrien Latil, Marseille, France

Application April 4, 1938, Serial No. 199,939
In Germany April 10, 1937

2 Claims. (Cl. 74—30)

The alternating rectilinear movement of the piston of an internal combustion engine, steam engine or the like is generally transformed into rotary continuous movement by means of an ordinary system of crank and crankshaft.

It is known that this arrangement gives a bad efficiency by reason of the reduction in forces due to the components which are created through the effect of the inclination of the connecting rod and the friction forces arising from the same source.

The present invention has for subject a device for transforming an alternating rectilinear movement into a continuous rotary movement for use in all machines or motors in which is used the system of a simple crank and connecting rod.

The accompanying drawing is given by way of example to illustrate a possible form of construction, but it is obvious that the details of construction can vary without changing the scope of the invention.

In this drawing:

Figure 1 shows the whole of the device in side view and in section taken on the line 2—2 of Fig. 2 which is a front view corresponding to Fig. 1 in section taken on the line 1—1 of that figure.

The device comprises for a single cylinder for example, without the number being thereby limited, the cylinder 3 of normal type for instance, having a piston 4 of slight height which carries two parallel rods 5 connected at their free ends by a cross bar 6. The ends of the rods 5 form a bridge or stirrup in which is articulated an auxiliary connecting rod 7 which at its other extremity 8 connects with a crank head 9 carried by two arms 10—11 (Fig. 2) which can oscillate on two spindles or the like 12, 13 situated on two other arms 14, 15 forming the cranks of a shaft 16.

The arm 10 carries in the axis of the head 8 a trunnion 17 on which is articulated a cheek or plate 18 which can oscillate likewise on another trunnion 19 placed in the extension of the axis 12. The cheek 18 is of triangular form (Fig. 1) two apexes of which are provided with housings for the trunnions 17—19 whilst the third apex carries a roller 20 which moves in a cam 21 the function of which will be made clear in the description of the operation of the device.

Between the two rods 5 of the piston, is arranged a rack 22 secured fast to the rods 5, adjusted relatively to the piston 4 in such a manner that when this latter is at the upper dead centre, the first recess or the rack 22 comes opposite the first tooth of a toothed sector 23 mounted on the main shaft 24 of the motor, which carries a toothed wheel 25 which, through the intermediary of a wheel 26 drives a toothed wheel 27 fast on the auxiliary shaft 16.

The wheel 25 and the pinion wheel 27 are of a ratio of two to one, that is to say that for one revolution of the wheel 25, the pinion wheel 27 will make two revolutions. On the other hand the toothed sector 23 has a number of teeth such that, the piston reaching the lower dead centre, the connection ceases between the teeth of the rack and those of the sector. By this fact the piston can rise freely whilst the sector 23 and consequently the wheel 25 and motor shaft 24 continue their rotary movement.

So that the displacement of the rods 5 and consequently the rack 22 shall occur in a rectilinear plane, the ends of the rods 5 can be held by a slide arrangement of any known kind such as the slide 28 which moves in a slideway 29 which is stationary (Fig. 1) without this example being taken as limiting the invention.

The operation is as follows:—

When the piston 4 is at the upper dead centre, the whole device is situated as shown in Figures 1 and 2, that is to say the sector 23 at the moment when it will be engaged by the rack 22 and the arms 10, 11 in prolongation of the arms 14—15. This position of the arms is obtained by the effect of the roller 20 engaged in the cam 21, the eccentricity of which at this point exactly determines this position through the effect of the two articulations 17, 19 actuated by the cheek or plate 18.

The piston 4 being pulled downwardly under the effect of the explosion in an internal combustion engine or the like or by the expansion force in a steam engine or by gas, and supposing that the whole device has already received a movement over the upper dead centre, the rack acts on the sector 23 which drives the shaft 24 with a maximum motor couple by reason of the leverage which is constantly equal to the radius of the sector and of the tangential force also at its maximum owing to the fact that this force is always perpendicular to the leverage.

In this movement of the motor shaft 24, the wheel 25 drives the pinion wheel 27 through the intermediary of the wheel 26 and the connecting rod 7 follows the descending movement driven in turn by the arms 10, 11 and 13, 14 which are rendered integral with the cheek or plate 18.

The simultaneous movements of the sector 23 and of the head 9 not having the same linear speeds, the rigidity of the crank thus formed by the arms 10, 11 and 13, 14 would have for result the impossibility of movement of the whole device the displacements of which are bound up with the rack 22, the sector 23 and the gear 25, 26, 27. For this reason the cheek or plate 18 has been introduced which, by a differential movement given by the cam 21 of a profile exactly determined for this purpose, regulates the release of the two movements of the rod 7 and shaft 16 which is directly driven by the rack.

When the piston 4 reaches the lower dead centre, the sector becomes free of the rack 22 and set going in the direction of the arrow, continues its forward movement. The head 9 takes up again its normal position through the effect of the cheek or plate 18, roller 20 and cam 21, and drives the piston which rises to the upper dead centre for a new descent movement.

In the case illustrated in the drawing the device is foreshadowed for an internal combustion engine of the four stroke cycle for which reason the shaft 16 makes two revolutions whilst the driving shaft 24 makes only one revolution and the sector 23 is only in engagement with the rack 22 for the time the motor is driving, all the other periods occurring by reason of the crank and connecting rod.

It is obvious that the sector 23 could be duplicated that is to say formed of two diametrically disposed sectors and in this case the second sector would act on the rack during the suction stroke.

From the foregoing description it will be clear that all the parts for the auxiliary service, except the rack 22 and the sector 23 can be light and of small dimensions in ratio only of the resistances arising over the three periods of the cycle which are not the driving stroke.

This arrangement can be combined equally well for several cylinders, the principle remaining unchanged.

I claim:

1. Device for transforming alternating rectilinear movement of a piston into continuous rotary motion comprising a piston, two rods connected to said piston, a cross bar connecting the free ends of said rods, a rack carried by said rods, a main shaft, a toothed sector mounted on said main shaft for intermittent engagement with said rack, a connecting rod at one end connected to said cross bar, means guiding said connecting rod, an auxiliary shaft, a crank on said auxiliary shaft, means pivotally connecting the other end of said connecting rod to said crank, a plate carried by said crank, gearing connecting main shaft to the auxiliary shaft, a stationary cam, a roller carried by the plate engaging a race in said cam and arms pivotally connected together and pivotally connected with said plate, said arms constituting the limbs of the crank.

2. Device for converting reciprocating rectilinear movement of a piston into continuous rotary motion comprising an engine piston two rods carried by said piston, a cross bar connecting the free ends of said rods, a rack carried by said rods, said rack being disposed between said rods, a main shaft, a toothed sector mounted on said main shaft, the rack engaging said sector for moving said sector during the driving stroke of the piston, a connecting rod at one end connected to said cross bar, a slide and slideway for guiding said connecting rod, a counter shaft, a crank head, arms pivotally connected together connecting said crank head with said counter shaft constituting a crank, said connecting rod at the other end being connected to said crank head, a triangular plate pivotally connected to said arms, gearing connecting the main shaft with the counter shaft, a stationary cam and a roller on said triangular plate engaging in a race in said stationary cam, the rack engaging the sector during the outward driving movement of the piston.

ADRIEN LATIL.